United States Patent [19]

Hongo et al.

[11] Patent Number: 4,903,316
[45] Date of Patent: Feb. 20, 1990

[54] BINARIZING APPARATUS

[75] Inventors: Yasuo Hongo; Kouichi Toyama, both of Kanagawa, Japan

[73] Assignee: Fuji Electric Co., Ltd., Kanagawa, Japan

[21] Appl. No.: 50,220

[22] Filed: May 15, 1987

[30] Foreign Application Priority Data

May 16, 1986 [JP] Japan .................. 61-110684
Nov. 21, 1986 [JP] Japan .................. 61-276709

[51] Int. Cl.$^4$ ............................ G06K 9/38
[52] U.S. Cl. ...................... 382/52; 382/50; 358/464
[58] Field of Search ............ 382/27, 41, 50, 51, 382/52, 54; 358/282-284

[56] References Cited

U.S. PATENT DOCUMENTS

| 4,238,768 | 12/1980 | Mitsuya et al. | 382/52 |
| 4,342,051 | 7/1982 | Suzuki et al. | 358/283 |
| 4,521,773 | 6/1985 | Lyon | 382/50 |
| 4,562,486 | 12/1985 | Suzuki et al. | 358/282 |
| 34,578,712 | 3/1986 | Matsunawa | 358/282 |
| 4,586,089 | 4/1986 | Nakazato et al. | 358/282 |

OTHER PUBLICATIONS

English language abstract of Japanese Patent Publication No. 158032/85, Hongo, Yasuo, "Binary Coding Device", 7/19/85.

Primary Examiner—Leo H. Boudreau
Assistant Examiner—Jose L. Couso
Attorney, Agent, or Firm—Finnegan, Henderson, Farabow, Garrett, & Dunner

[57] ABSTRACT

A binarizing apparatus used for optical character readers or character-and-graphic input devices, in which a sharp binary image can be obtained even from low-contrast character lines (or line segments) by discriminating a line graphic from stains wider than the character lines or from blurs in the background thereof. Eight surrounding subwindows are disposed around a target subwindow enclosing a target pixel, the surrounding subwindows being separated from each other at a distance larger than the character line width, and each of the subwindows having 3×3 pixels. The average density value of the respective subwindow is calculated to thereby compare the respective density values of the target subwindow and each surrounding subwindow or compare the density values of the respective surrounding subwindows. Consequently, whether the target pixel belongs to character line or whether it does not belong thereto, is judged to thereby perform binarizing.

8 Claims, 11 Drawing Sheets

BINARIZING APPARATUS

FIELD OF THE INVENTION

The present invention relates to a binarizing apparatus for line graphic images for use in optical character readers, character-and-pattern input devices, or the like.

BACKGROUND OF THE INVENTION

Generally, with respect to low-contrast laser-printed characters and stamp or seal characters, it is difficult to obtain sharp binary images because of blurs or stains on the background thereof. To solve the problem, Applicant proposes a method of automatically deciding an optimum binarizing level corresponding to a change in background level. This method is an improvement over the conventional method in which the binarizing level is set to a fixed value (reference is made, for example, to Japanese Patent Application No. 158032/1985.)

A binarizing apparatus in accordance with the proposed method comprises a converter for converting a pixel density level into a digital quantity, a two-dimensional local memory for storing a value of density of each pixel to form a move mask of a predetermined size, a detection circuit for detecting the minimum (or maximum) value of density in the move mask, and a correction circuit for correcting the representative value of the background level represented by the minimum (or maximum) value in the move mask.

In the method, the variation in background level depending on the position is detected by a move mask, and a threshold for binarizing of a target pixel is decided by reference to a representative background level in the move mask with addition of a predetermined correction value to thereby perform binarizing appropriately for every position. If the move mask is formed to have an area of N×N meshes (Pixels) sufficiently larger than the line width in the line graphic, it is possible to make any one of the mesh points in the move mask be a background point.

In this case, however, if binarizing is made with a thresh-old level near the density value of the background, the blurs or stains in the background are also binarized, thereby making it difficult to read the characters, though the lines of the characters are reproduced thickly. Conversely, if binarizing is made with such a threshold level as not to reproduce blurs or stains in the background, character lines to be reproduced become blurred. In short, because lines are not discriminated from blurs or stains, the conventional binarizing apparatus binarizes the density values of the same degree equally.

OBJECTS AND SUMMARY OF THE INVENTION

An object of the present invention is to provide a binarizing apparatus in which a sharp binary image can be obtained even from low-contrast character lines (or line segments) by discriminating a line graphic from stains wider than the character lines and/or blurs in the background.

Another object of the invention is to provide a binarizing apparatus in which character lines can be extracted even when the background gently varies with a period not smaller than the width of a square grating window.

A further object of the invention is to provide a binarizing apparatus in which the influences due to a small noise or the like can be eliminated.

The foregoing objects of the invention are attained in the following manner. A target subwindow is formed around a target pixel and four pairs of surrounding subwindows oppositely disposed in four directions (horizontal, vertical and two oblique directions) are formed around the target subwindow, whereby discrimination of character lines is performed on the basis of the background flatness and the target density difference, the background flatness being obtained on the basis of the density difference between opposite surrounding subwindows and the background density difference which is the difference between an average density value and a background density value, the target density difference being a difference between a target density value and an average density value, or the objects of the invention are attained by such a manner that the binarizing is performed on the basis of a judgement as to whether the target pixel is a background pixel or not which is performed through a comparison of a target pixel with surrounding pixels, and a judgement as to how background pixels and line pixels are arranged in the surroundings of the target pixels.

According to the former manner, character lines can be extracted even when the background gently varies with a period not less than the width of a square grating window, because the discrimination of character lines is made on the basis of the relation of the target subwindows with the surrounding subwindows.

According to the latter manner, the influences of a small noise or the like can be eliminated because an average density value and a uniform discrimination flag are found with respect to the 3×3 area of pixels including the target pixel.

BRIEF DESCRIPTION OF THE DRAWINGS

The manner in which the above and other objects, features, and advantages of the present invention are achieved and the construction and operation of the invention itself will be more apparent upon reading the following detailed description in view of the drawings, wherein.

DETAILED DESCRIPTION OF THE PREFERRED EMBODIMENTS

Figure 1:
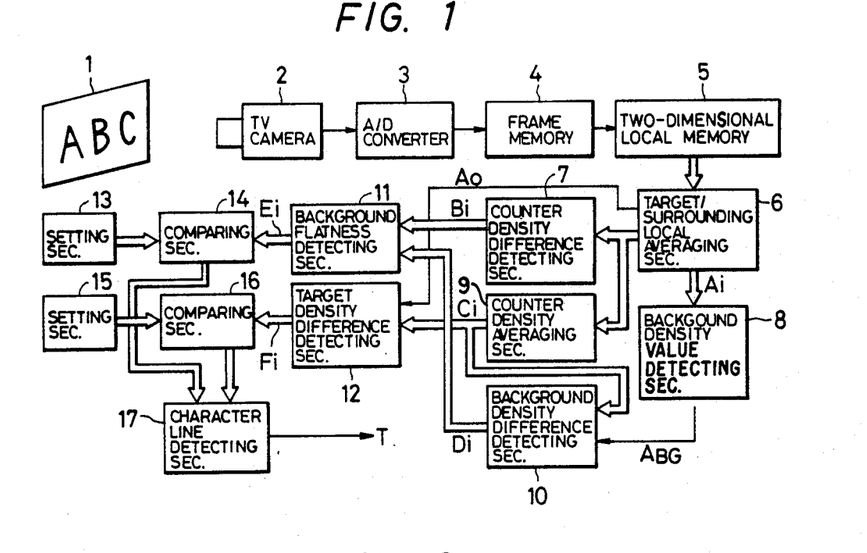
FIG. 1 is a diagram showing a first embodiment of the present invention.

FIG. 1 is a diagram showing a first embodiment of the present invention. In the drawing, the arrangement comprises characters 1 to be identified, an image pickup device 2 such as a television camera or the like, an analog-to-digital (A/D) converter 3, a frame memory 4, a two-dimensional local memory 5 (which is commonly known), a target/surrounding local averaging section 6, a counter density difference detecting section 7, a background density value detecting section 8, a counter density averaging section 9, a background density difference detecting section 10, a background flatness detecting section 11, a target density difference detecting section 12, a flatness upper limit setting section 13 (setting section), comparing sections (comparators) 14 and 16, a target density difference lower limit setting section 15 (setting section), and a character line detecting section 17.

The discrimination principle of the apparatus constructed as described above will be described.

Binarizing is performed on the basis of a judgement as to whether each pixel is a character line pixel. This judgement is carried out by use of a square grating window composed of nine subwindows independently separately disposed centering a target pixel. Each subwindow has a square area of 3×3 pixels. In other words, the binarizing is performed in such a way that surrounding subwindows are disposed at eight places around a target subwindow enclosing a target pixel and are separated from the target subwindow at a distance not less than a line width. The background flatness and the target density difference for a pair of opposite surrounding subwindows with respect to the target subwindow are found and a decision is made as to whether the target subwindow belongs to character line area. This binarizing allows a sharp binary image to be obtained even from low-contrast character lines.

In the following, the operation of the arrangement will be described.

As shown in FIG. 1, the characters 1 to be identified are converted into electric signals by an image pickup device such as a television camera 2 or the like, and the electric signals are converted into digital images by the A/D converter 3. The digital images are stored in the frame memory 4. While the digital images are read out from the frame memory 4, a square grating window having M rows and N columns is formed by the two-dimensional local memory 5. The two-dimensional local memory 5 is commonly known. The square grating window is composed of one target subwindow and eight surrounding subwindows. The size (M rows and N columns) of the two-dimensional local memory is determined in accordance with the size of the square grating window. The respective average density values of the target subwindow and the surrounding subwindows are arithmetically calculated by the local averaging section 6. The background density value $A_{BG}$ (the average value in the subwindows) is calculated from the surrounding subwindows by the background density value detecting section 8. The density value difference between opposite surrounding subwindows is arithmetically calculated by the counter density difference detecting section 7. The average density of the opposite subwindows is calculated by the counter density averaging section 9, and the difference between the average density of the opposite subwindows and the background density value, $A_{BG}$, is calculated by the background density difference detecting section 10. The representative values (maximum or minimum values) of the counter density difference and the background density difference are calculated by the background flatness detecting section 11. From the counter density average and the target density value, the target density difference in every counter direction is arithmetically calculated by the target density difference detecting section 12. The comparator 14 performs comparison between the background flatness in every direction and the flatness upper limit given by the setting section 13, and comparator 16 performs comparison between the target density difference and the target density difference lower limit given by the setting section 15. The character line detecting section 17 judges whether the target subwindow is at a position between opposite background subwindows or not. As a result, when the target subwindow is at a position between the opposite background subwindows having the background density values, a binarized signal T of "High" is generated.

Figure 2:
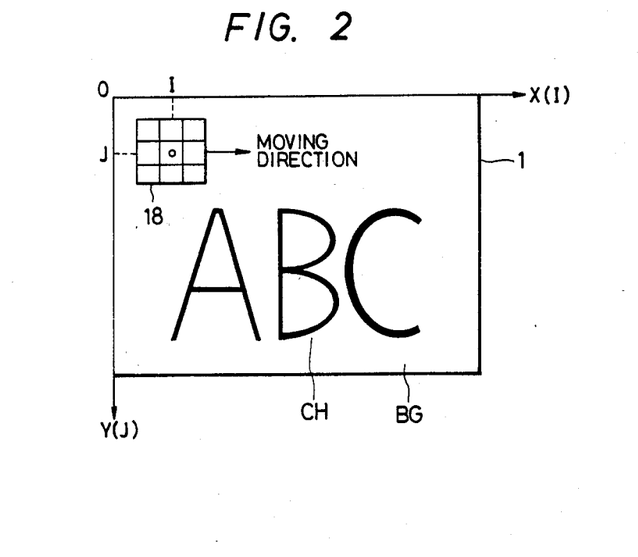
FIG. 2 is an explanatory drawing showing an example of the quantized image.

FIG. 2 shows an example of a quantized image on the frame memory 4. In the case of a character, the line width is small and approximately constant as shown in the drawing. In the case of a black character, the density value of a background pixel BG is larger than that of a character pixel CH. In the case of a white character, the density value of BG is smaller than that of the character pixel CH. The length of a surrounding subwindow is equal to the line width (the length of one pixel) or equal to the total length of several pixels. The subwindow 18 (having 3×3 pixels) moves in the same direction as the scanning direction. The subwindow is formed by the two-dimensional local memory 5. The formation of the subwindow having 3×3 pixels removes the influences of isolated noise and the like.

Figure 3:
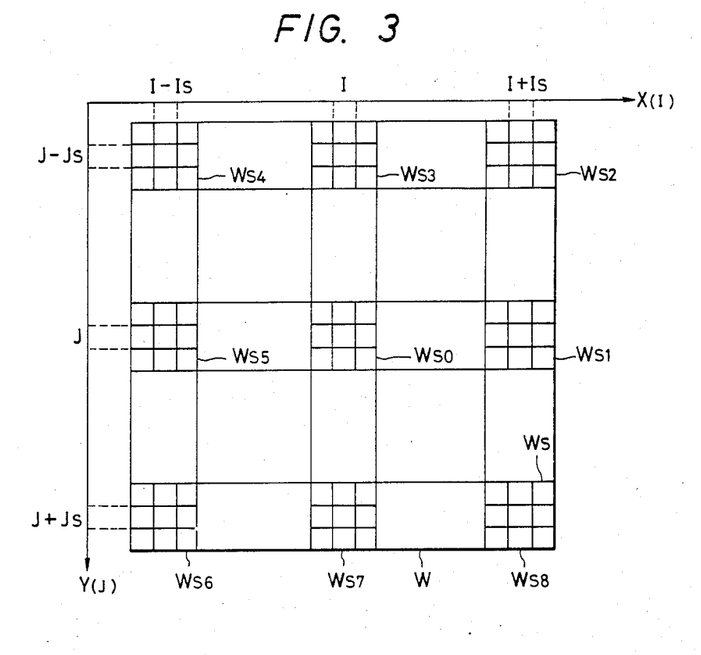
FIG. 3 is a conceptual drawing showing the structure of the square grating window.

FIG. 3 shows a square grating window W composed of nine subwindows $W_S$ ($W_{S0}$ to $W_{S8}$). The target subwindow $W_{S0}$ has a rectangular area, for example, of 3×3 pixels centered on a target element. The density value of the target subwindow is the average value of the 3×3 pixels. Surrounding subwindows respectively having 3×3 pixels are formed at distance of $I_S$ (or $J_S$) pixels from the target pixel (I, J). For example, if the line width corresponds to five pixels, the value of $I_S$ (or $J_S$) is set to a value of between five pixels to eight pixels inclusive. The size of the respective subwindows is selected to ensure uniform density values in the image.

Figure 4:
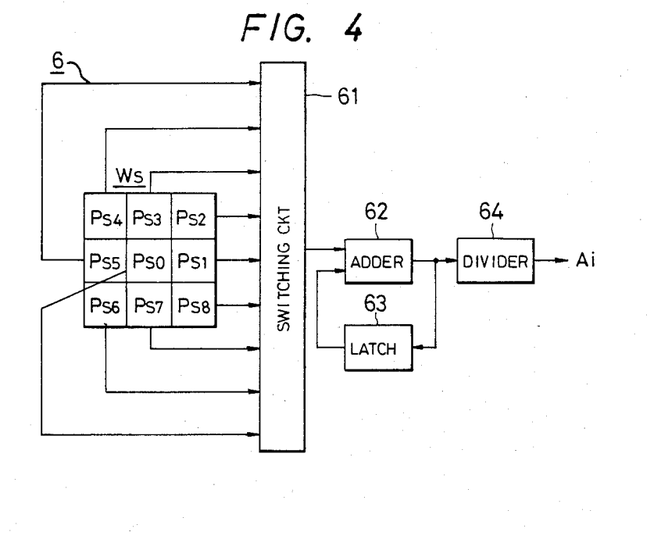
FIG. 4 is a block diagram showing the construction of the local averaging section.

FIG. 4 shows the construction of the target/surrounding local averaging section 6 for performing arithmetical calculation of an average density value of each of the respective subwindows. The local averaging section 6 includes a nine-input-and-one-output switching circuit 61, an adding circuit 62, a latch circuit 63, and a dividing circuit 64. Nine pixel density values, $P_{S0}$ to $P_{S8}$, are successively input to the adding circuit 62 from the switching circuit 61 and latched by the latch circuit 63 to thereby add up the values. The sum amount is divided by a constant "9" in the dividing circuit 64 to thereby calculate an average value $A_i$. The latch circuit 63 is initially set to zero. The average value $A_i$ is expressed as follows.

$$A_i = (P_{S0} + P_{S1} + P_{S2} + P_{S3} + P_{S4} + P_{S5} + P_{S6} + P_{S7} + P_{S8})/9$$

The values of $A_0$ to $A_8$ represent average density values at the subwindows $W_{S0}$ to $W_{S8}$, respectively.

Figure 5:
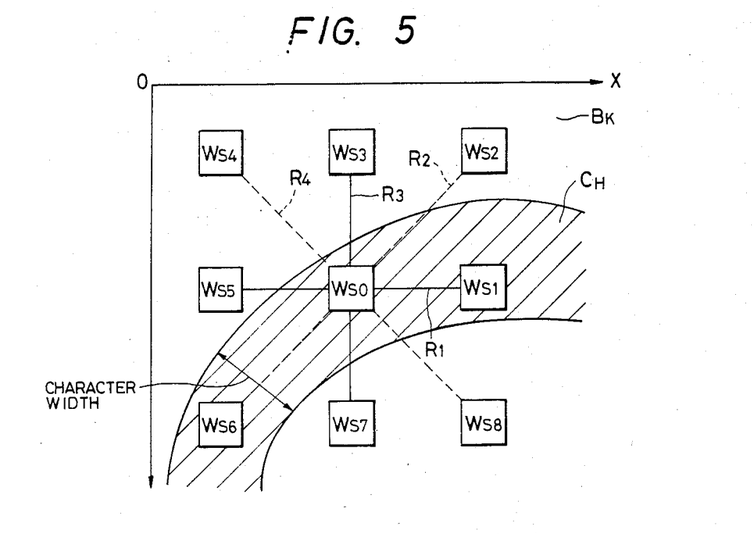
FIG. 5 is a view for explaining the relation between a character line and each subwindow.

A judgement as to whether the target subwindow $W_{S0}$ belongs to a character line or to the background is made as shown in FIG. 5. In the drawing, $W_{S1}$ and $W_{S5}$ represent a pair of surrounding subwindows having the relation R1. In the same manner, $W_{S2}$ and $W_{S6}$ represent a pair of surrounding subwindows having the relation R2; $W_{S3}$ and $W_{S7}$ represent a pair of surrounding subwindows having the relation R3; and $W_{S4}$ and $W_{S8}$ represent a pair of surrounding subwindows having the relation R4. It is now assumed that any one pair of subwindows exist in the background exist in the background when the distance between subwindows is larger than the line width and the target subwindow exists in the character line. In FIG. 5, the pair of subwindows having the relation R3 and the pair of subwindows having the relation R4 exist in the background. If wide stains or blurs exist in the image, it is uncommon for both of opposite subwindows to exist in the background. Although opposite subwindows having background density values should be different in density value from the target subwindow which exists in the character line, the density difference between the target subwindow and the surrounding subwindow is small if wide stains exist in the image. In this viewpoint, whether the target subwindow belongs to the character line or whether it does not belong thereto can be judged by calculation of the background flatness and the target density difference.

Figure 6:
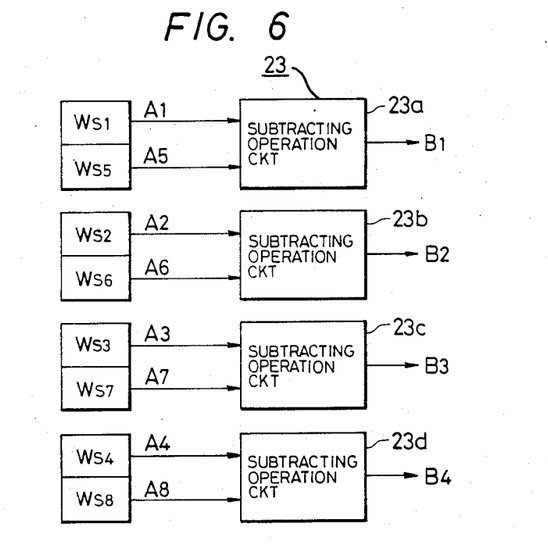
FIG. 6 is a block diagram showing the construction of the counter density difference detecting section.

FIG. 6 is a block diagram showing an example of the counter density difference detecting section 7. In the drawing, the reference numerals 23a to 23d represent subtracting operation circuits to which average density values $A_i$ for opposite subwindows are introduced. Accordingly, for example, the density difference ($A_1-A_5$) between the opposite subwindows $W_{S1}$ and $W_{S5}$ is generated as $B_1$ from the subtracting operation circuit 23a. In the same manner, density differences $A_2-A_6$, $A_3-A_7$, and $A_4-A_8$ are calculated by the subtracting operation circuits 23b, 23c, and 23d, respectively.

Figure 7:
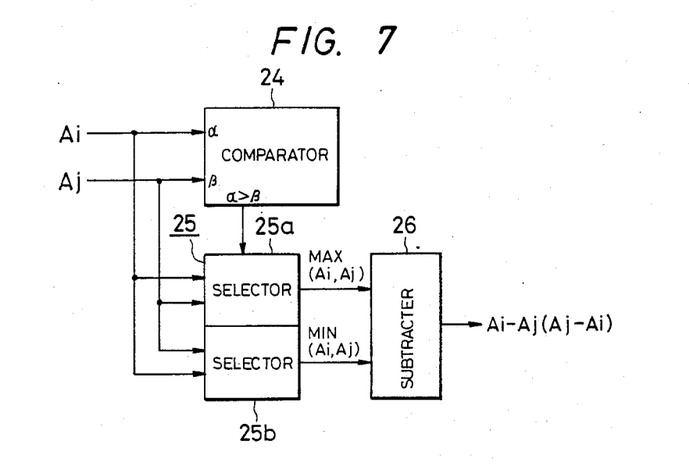
FIG. 7 is a block diagram showing an example of the difference operating circuit.

For example, as shown in FIG. 7, each respective subtracting operation circuit 23a-23d is composed of a comparator 24, selectors 25 (25a and 25b), and a subtracter 26. The comparator 24 performs comparison between the average density values $A_i$ and $A_j$. If $A_i$ is larger than $A_j$, $A_i$ and $A_j$ are respectively selected as the maximum and minimum values by the selectors 25 (25a and 25b). After the selection, the subtracter 26 performs subtraction to calculate the result ($A_i-A_j$). If $A_i$ is not larger than $A_j$, one selector 25a selects $A_j$ and the other selector 25b selects $A_i$. After the selection, the subtracter 26 performs subtraction to calculate the result ($A_j-A_i$), yielding one of counter subwindow density differences $B_1$ to $B_4$ of FIG. 6.

Figure 8:
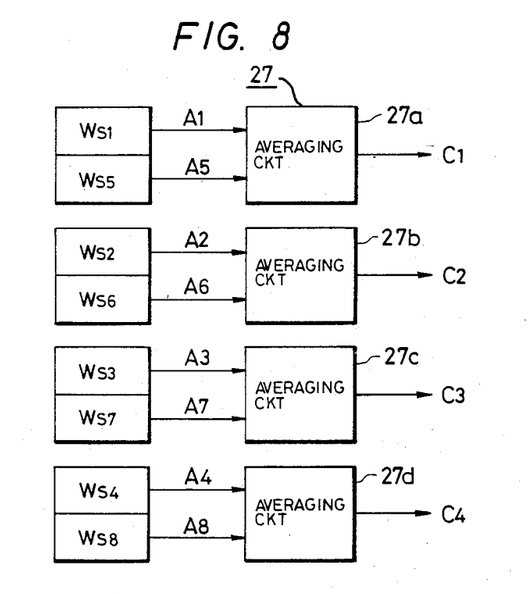
FIG. 8 is a block diagram showing the construction of the counter density averaging section.

FIG. 8 shows the counter density averaging section 9. The section is composed of averaging circuits 27 (27a to 27d). For example, the average value of the values $A_1$ and $A_5$ from the counter subwindows $W_{S1}$ and $W_{S5}$, respectively, is calculated by the averaging circuit 27a. In the drawing, the respective averaging circuit 27 is a two-input adder which divides by "2" by means of one-bit-shifting to yield the results $C_1$ to $C_4$.

Figure 9:
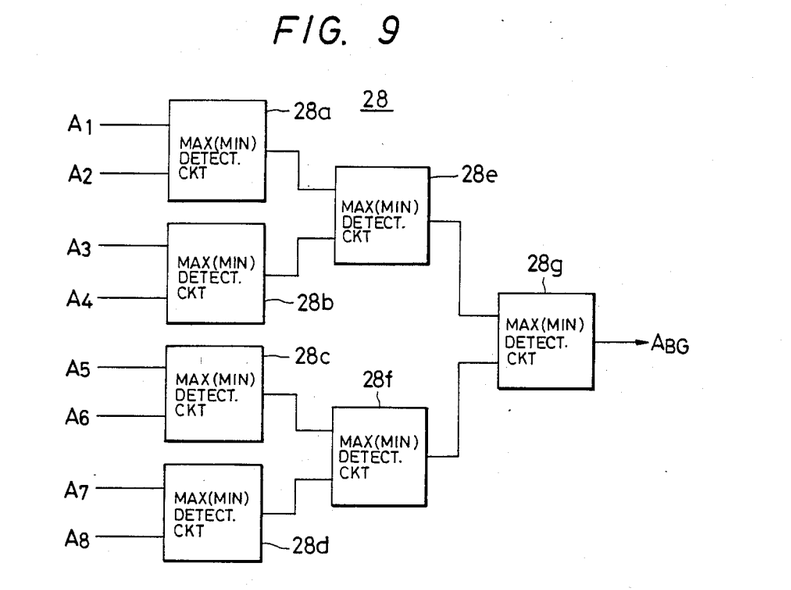
FIG. 9 is a block diagram showing the construction of the background density value detecting section.

FIG. 9 shows the background density value detecting section 8 for calculating a background density value from surrounding subwindows. In the case of a black character, the maximum value of the surrounding subwindow density values is detected as a background density value. In the case of a white character, conversely, a minimum value is detected. Accordingly, the detecting circuit 28 is a maximum detecting circuit in the case of black character and a minimum detecting circuit in the case of a wite character.

Figure 10:
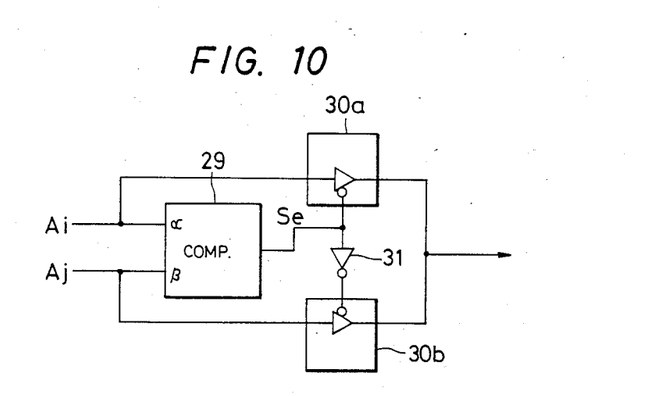
FIG. 10 is a block diagram showing an example of the maximum detecting circuit.

FIG. 10 shows an example of the maximum (or minimum) detecting circuit. The circuit is composed of a comparator 29, tri-state buffers 30a and 30b, and an inverter gate 31. The comparator 29 compares the values of the inputs $A_i$ and $A_j$ to generate a select signal $S_e$ to thereby choose between the buffer 30a for the input $A_i$ and the buffer 30b for the input $A_j$. While one buffer is selected, the other buffer is not selected. Accordingly, the select signal $S_e$ is inverted by the inverter gate 31 before being input to buffer 30b. In the case of maximum detection, the signal $S_e$ turns to "High" in the condition $A_j >= A_i$ to thereby make the buffer 30b open or the signal $S_e$ turns to "Low" in the condition $Aj \leq Ai$ to thereby make the buffer 30a open. In the case of minimum detection, the logic of the signal $S_e$ is reversed.

Figure 11:
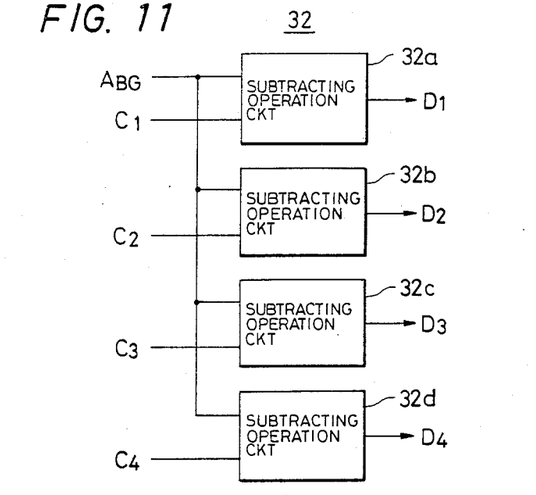
FIG. 11 is a block diagram showing the construction of the background density difference detecting section.

FIG. 11 shows the background density difference detecting section 10. In the same manner as the counter density difference detecting section of FIG. 6, this section is composed of subtracting operation circuits 32 (32a to 32d). Each respective subtracting operation circuit 32 calculates the difference between the background density value $A_{BG}$ and the counter subwindow average density value $C_1$ to $C_4$ to generate background density differences $D_1$ to $D_4$, respectively.

Figure 12:
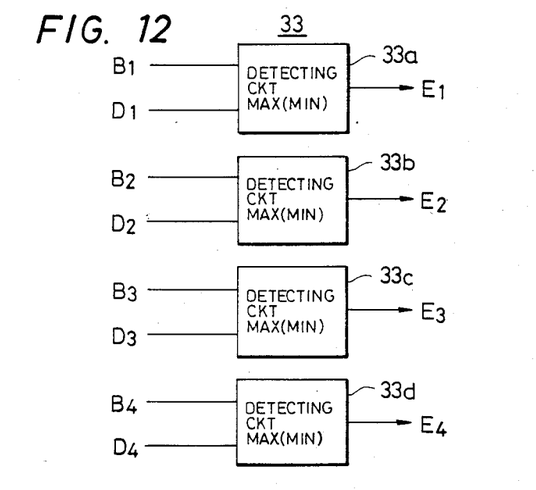
FIG. 12 is a block diagram showing the construction of the background flatness detecting section.

FIG. 12 shows the background flatness detecting section 11. The maximum values (or minimum values) of the counter density differences of FIG. 6 ($B_1$ to $B_4$) and the background density differences of FIG. 11 ($D_1$ to $D_4$) are calculated by detecting circuits 33a to 33d, respectively. Each respective detecting circuit 33 operates in a manner similar to the circuitry of FIG. 9. In the case where an exact judgement of flatness $E_1$ to $E_4$ is required, preparation is made to detect the maximum values. In the case where a soft judgement is required, preparation is made to detect the minimum values.

Figure 13:
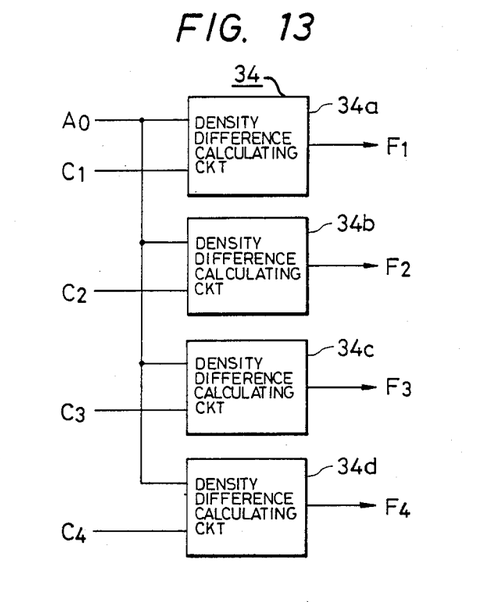
FIG. 13 is a block diagram showing the construction of the target concentration difference detecting section.

FIG. 13 shows the target density difference detecting section 12. In this section, the differences between the target subwindow density value $A_0$ and the counter subwindow density average values $C_0$ to $C_4$ for each counter direction are calculated by density difference arithmetical operating circuits 34 (34a to 34d), thereby generating target density differences for each counter direction.

Figure 14:
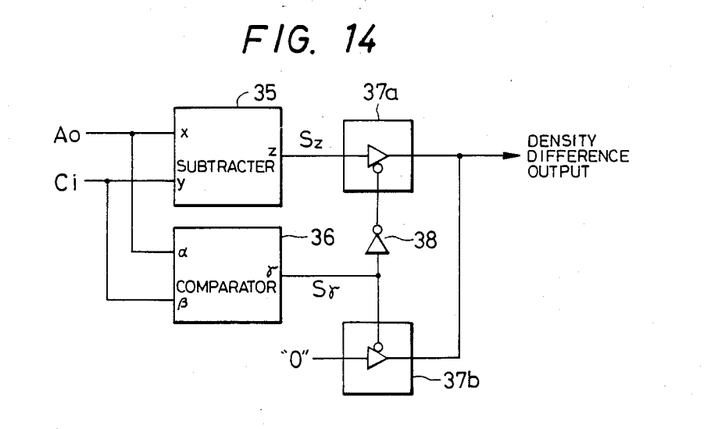
FIG. 14 is a block diagram showing an example of the density difference operating circuit.

FIG. 14 shows an example of the respective density difference arithmetical operating circuit 34. The circuit 34 is composed of a subtracter 35, a comparator 36, tri-state buffers 37a and 37b, and an inverter gate 38. The difference between the target density value $A_0$ and the counter average density value $C_i$ is calculated by the subtracter 35. If the result is negative, the comparator 36 generates a select signal $S\gamma$, which opens the buffer 37b and sends the value "0" as a density difference signal instead of the result $S_z$. In the case of a black character, because the output $S_z$ of the subtracter 35 is expressed by $C_i$-$A_0$, the signal $S_z$ is output when $C_i > A_0$ and the value "0" is output when $C_i < = A_0$. The inverter gate 38 chooses between the buffers 37a and 37b. On the other hand, in the case of a white character, because the output $S_z$ of the subtracter 35 is expressed by $A_0$-$C_i$, the value "0" is output when $A_0 < = C_i$.

Figure 15:
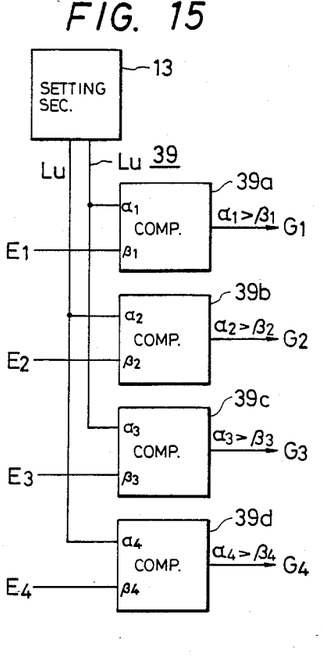
FIG. 15 is a block diagram showing the construction of the background flatness comparing section.

FIG. 15 shows the background flatness comparing section 14 and the setting section 13. In comparators 39a to 39d, the respective flatnesses $E_1$ to $E_4$ detected by the detecting section of FIG. 12 are compared with an upper limit $L_u$ given by the setting section 13. If the flatness is smaller than the upper limit, the respective output $G_1$ to $G_4$ is set to "High". If the flatness is larger than the upper limit, the respective output $G_1$ to $G_4$ is set to "Low".

Figure 16:
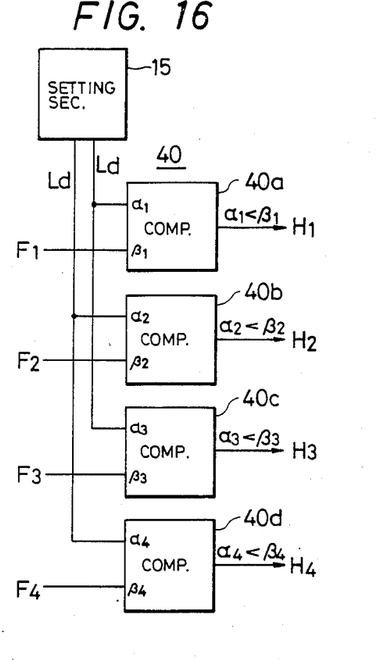
FIG. 16 is a block diagram showing the construction of the target density difference comparing section.

FIG. 16 shows the circuitry construction of the target density difference comparing section 16 and the setting section 15. In comparators 40a to 40d, the respective target density differences $F_1$ to $F_4$ detected by the detecting section of FIG. 13 are compared with a lower limit $L_d$ given by the setting section 15. If the density difference is larger than the lower limit, the respective output $H_1$ to $H_4$ is set to "High". If the density difference is smaller than the lower limit, the respective output $H_1$ to $H_4$ is set to "Low". The upper limit $L_u$ and the lower limit $L_d$ as shown in FIGS. 15 and 16 may be different with the counter directions. In this embodiment, the values of $L_u$ and $L_d$ are different for the horizontal, vertical, and oblique directions.

Figure 17:
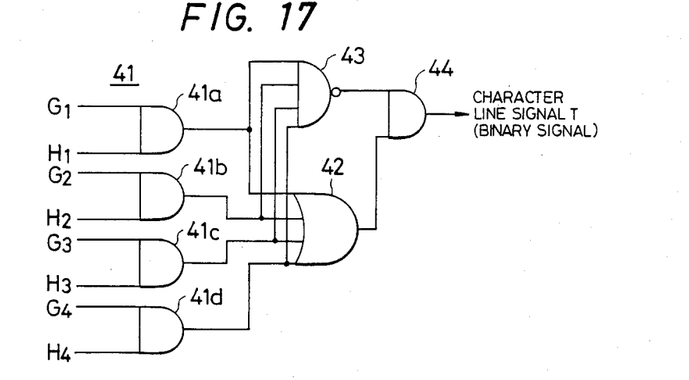
FIG. 17 is a block diagram showing the construction of the character line detecting section.

As shown in FIG. 17, the character line detecting section 17 judges whether the target window belongs to character line based on the results $G_1$ to $G_4$ and $H_1$ to $H_4$ of the comparisons between the flatness and the target density differences. The circuit is composed of AND gates 41 (41a to 41d) and 44, an OR gate 42, and a NAND gate 43. The AND gates 41a to 41d AND the flatness and the density difference for each direction. If at least one but not all of the inputs is high, the output of the AND gate 44 is set to "High". If none of the inputs is high or if all of the inputs are high, the output of the AND gate 44 is set to "Low". Accordingly, the output of the AND gate 44 is used as a character line signal, which corresponds to binary signal T. The NAND gate 43 is provided to output "0" when all the inputs are "1" because a character line will not yield inputs of only "1".

Figure 18:
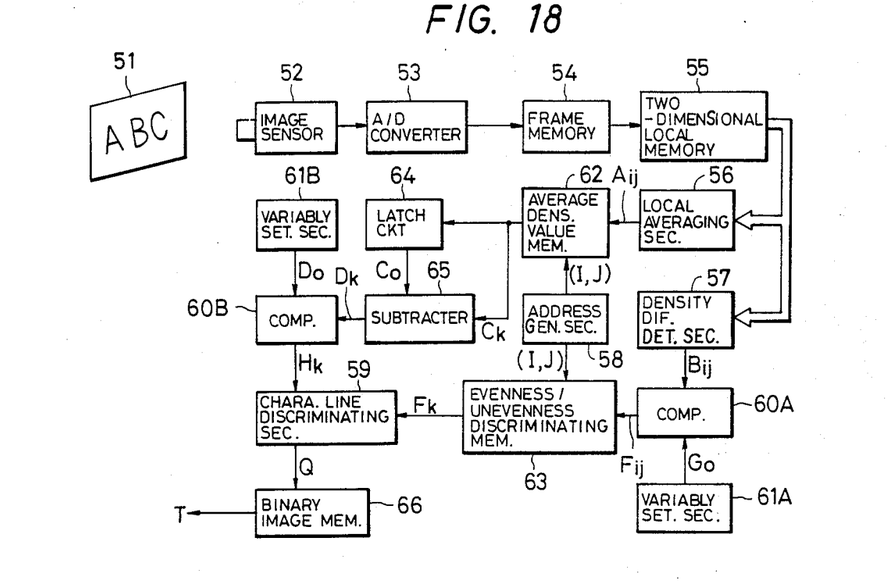
FIG. 18 is a diagram showing a second embodiment of the present invention.

FIG. 18 is a diagram showing a second embodiment of the invention. In the drawing, the arrangement comprises characters 51, an image sensor such as a television camera 52 or the like, an analog-to-digital (A/D) converter 53, a frame memory 54, a two-dimensional local memory 55, which is commonly known, a target/surrounding local averaging section 56 (local averaging section), a local maximum density difference detecting section 57 (density difference detecting section), an address generating section 58, a character line discriminating section 59, comparators 60A and 60B, a permissible density difference variably setting section 61A (variably setting section), a surrounding density difference variably setting section 61B (variably setting section), an average density value memory 62, an evenness/unevenness discriminating memory 63, a target average density value latch circuit 64 (latch circuit), a subtracter 65, and a binary image memory 66.

Figure 19:
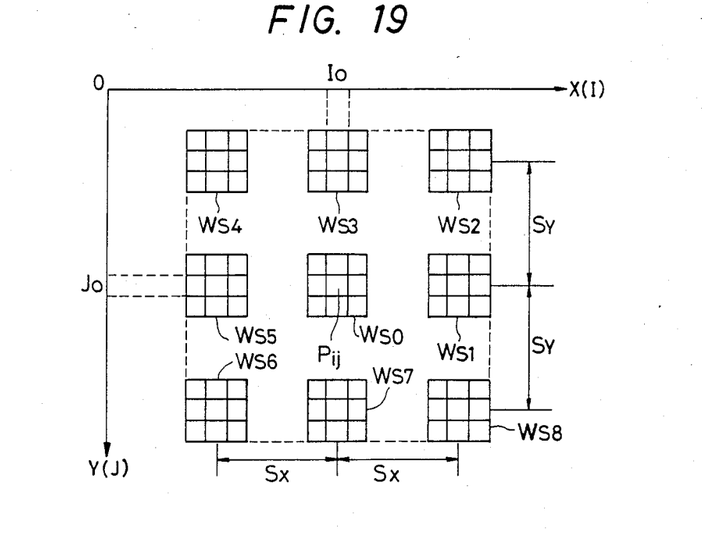
FIG. 19 is a view for explaining a group of subwindows used in the second embodiment.

As shown in FIG. 19, a target subwindow $WS_0$ and eight surrounding subwindows $WS_1$-$WS_7$ disposed around the target subwindow are formed such that each of the subwindows has $3 \times 3$ pixels and binarizing is performed on the basis of a judgement as to whether each pixel is a character line pixel. A target pixel is a character line pixel when the following two conditions are satisfied.

(a) Counter subwindows on the opposite sides of the target subwindows should have the background density values (counter condition). More particularly, the number of surrounding subwindows in which the density difference from the target subwindow is greater than or equal to than a predetermined value ($D_o$) should be greater than or equal to a predetermined number (for example, five).

(b) The density value of the target subwindow should be a line concentration value (contrast condition). More particularly, the number of surrounding pixels in which the density difference from the target pixel is not greater than or equal to a predetermined value ($G_o$) should be greater than or equal to a predetermined number (for example, three).

The span ($S_x$ or $S_y$) between surrounding subwindows is set to be larger than the line width so that at least one surrounding subwindow has a background density value. The density value of the target subwindow should be significantly different from the background density value when the target subwindow belongs to the character line. Accordingly, the condition (a) is required. This requirement is based on the premise that, in the case of a black character, the line density value is smaller than the background density value (or that, in the case of a white character, the line density value is larger than the background density value). In any case, however, the density values of surrounding subwindows oppositely disposed on the opposite sides of the target subwindow ought to coincide with the background density value. The term "surrounding subwindows" as used herein means not only the subwindows disposed on a straight line but also all the subwindows opposite to the target subwindow.

Referring to FIG. 18, characters 51 are picked up by the image sensor 52, such as a television camera or the like, and each one of these characters, respectively, is converted into a digital image by the A/D converter 53. The digital image is stored in the frame memory 54. While the digital image is read out one pixel at a time from the frame memory 54 in the order of scanning by the television camera, a move subwindow which, for example, has $3 \times 3$ pixels, is formed by the two-dimensional local memory 55. With respect to the local area of the target subwindow, an average density value $A_{ij}$ is calculated by the local averaging section 56 and stored in the average density value memory 62. The maximum value $B_{ij}$ of the density difference between the target pixel and its vicinity is detected by the density difference detecting section 57. If the maximum density difference $B_{ij}$ is larger than the permissible density difference $G_o$, it can be considered that the local area is uneven, and the discrimination flag $F_{ij}$ is set to "0". If the maximum density difference $B_{ij}$ is smaller than the permissible density difference $G_o$, it can be considered that the local area is even, and the discrimination flag $F_{ij}$ is set to "1". The permissible value $G_o$ is variably set by the variably setting section 61A, and the discrimination flag $F_{ij}$ is determined by the comparator 60A according to the following function:

$$F_{ij} = \begin{cases} 1: & B_{ij} \leq G_o \\ 0: & B_{ij} > G_o \end{cases}$$

The discrimination flag $F_{ij}$ is stored in the evenness-/unevenness discriminating memory 63. The contents of the average density value memory 62 and the evenness/unevenness discriminating memory 63 are read by the address generating section 58 in the order of the target subwindow and surrounding subwindows. The average density value $C_o$ at the target subwindow is latched by the latch circuit 64. The difference $D_k$ between the target average density value $C_o$ and the surrounding average density value $C_k$ (k=1, ..., 8) is calculated by the subtracter 65. In the case of a black character, $D_k$ is max $\{0, C_k\text{-}C_o\}$. In the case of a white character, $D_k$ is max$\{0, C_o\text{-}C_k\}$. The permissible value $D_o$ of the surrounding density difference is variably set by the variably setting section 61B. The surrounding density difference $D_k$ and the permissible value $D_o$ are compared with each other by the comparator 60B to thereby judge whether the density difference is not smaller than the difference between the background density value and the line density value or not. As the result, the value of the background discrimination flag $H_k$ is determined.

$$H_k = \begin{cases} 1: & D_k \geq D_o \\ 0: & D_k < D_o \end{cases}$$

On the basis of the evenness discrimination flag $F_k$ and background discrimination flag $H_k$, the character line discriminating section 59 judges whether the target pixel is a pixel of the character line or not. The discrimination result is stored in the memory 66. Binarized image T is read from the memory 66.

The operation will be described more in detail with reference to FIGS. 2, 4, and 18 through 22A.

An example of a subwindow group is shown in FIG. 19 in the same manner as in FIG. 3. In this embodiment, the average density value and the evenness discrimination flag are calculated for every subwindow and respectively stored in the memories 62 and 63 of FIG. 18. One pixel in each of the respective memories 62 and 63 corresponds to one subwindow (3×3 pixels of the original image). In short, the average density value and the evenness discrimination flag are respectively mapped on one pixel in each of the respective memories 62 and 63. FIG. 19 shows the case where such subwindows are disposed at 3×3 locations with the span of $S_X$ and $S_Y$ in the X and Y directions, respectively. The density value of the target subwindow $W_{S0}$ having 3×3 target pixels is expressed by $P_{ij}$. Eight surrounding subwindows $W_S$ ($W_{S1}$ to $W_{S8}$) disposed around the target subwindow $W_{S0}$ are defined.

The local averaging section 56 for calculating the average density value of the respective subwindows having 3×3 pixels can be constructed in the same manner as in FIG. 4. The average density value $A_{ij}$ of the respective subwindows calculated by the local averaging section 56 is stored in the memory 62.

Figure 20:
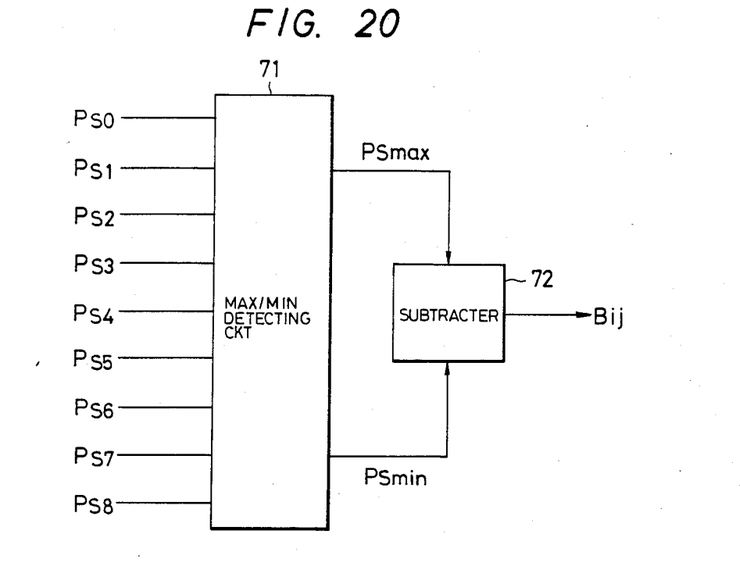
FIG. 20 is a diagram showing the local maximum density difference detecting section.

FIG. 20 shows an example of the local maximum density difference detecting section 57. The section is composed of a maximum/minimum detecting circuit 71, and a subtracter 72. The maximum value $P_{smax}$ and the minimum value $P_{smin}$ are detected from the density values $P_{S0}$ to $P_{S8}$ of all the pixels within the respective subwindows by the detecting circuit 71. The difference $B_{ij}$ between the maximum and minimum values is calculated by the subtracter 72. The output $B_{ij}$ is compared with the set value $G_o$ by the comparator 60A to perform the aforementioned determination of the evenness discrimination flag $F_{ij}$. The discrimination flag $F_{ij}$ is stored in the memory 63.

Figure 21:
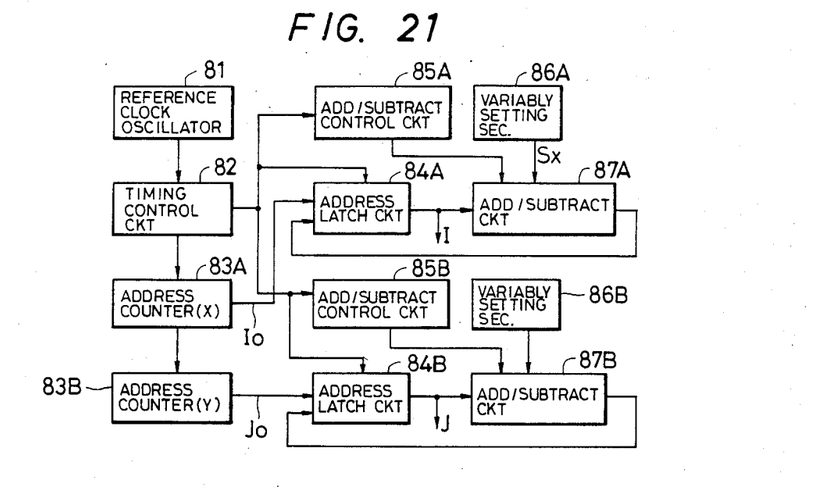
FIG. 21 is a diagram showing the address generating circuit.

FIG. 21 shows the address generating section 58 for reading the contents of the memories 62 and 63 with respect to the target and surrounding subwindows. In the drawing, the address generating section comprises a reference clock oscillator 81, a timing control circuit 82, X-direction and Y-direction address counters 83A and 83B, X-direction and Y-direction address latch circuits 84A and 84B, adding/subtracting operation control circuits 85A and 85B, X-direction and Y-direction span variably setting sections 86A and 86B, and adding/subtracting operation circuits 87A and 87B.

The timing control circuit 82 generates a control signal and a timing signal by reference to the clock from the oscillator 81 and feeds the signals to the address counter 83A. The address counter 83A counts the timing clock to thereby generate an X-direction address $I_o$ and counts up to other address counter 83B for every horizontal scanning line to thereby generate Y-direction address $J_o$ (See FIG. 19). The addresses ($I_o$,$J_o$) of the target subwindow are latched by the latch circuits 84A and 85B, respectively. Accordingly, the X and Y direction addresses (I,J) of the respective surrounding subwindows can be calculated by the adding/subtracting circuits 87A and 87B for performing adding or subtracting operations with respect to the output of the latch circuits 84A and 84B and the spans $S_x$ and $S_y$ set by the X and Y direction span setting sections. At this time, the adding/subtracting operation contron circuits 85A and 85B give instructions of an adding or subtracting operation to the adding/subtracting operation circuits 87A and 87B. The control procedure according to the adding/subtracting operation control circuits 85A and 85B is tabulated as follows.

TABLE

| | | Address | | Adding/subtracting operation control circuit | |
|---|---|---|---|---|---|
| Count | Subwindow | X | Y | 85A | 85B |
| 0 | $W_{S0}$ | $I_o$ | $J_o$ | Initial latch | Initial latch |
| 1 | $W_{S1}$ | $I_o + S_x$ | $J_o$ | Addition of $S_x$ | No change |
| 2 | $W_{S2}$ | $I_o + S_x$ | $J_o - S_y$ | No change | Subtraction of $S_y$ |
| 3 | $W_{S3}$ | $I_o$ | $J_o - S_y$ | Subtraction of $S_x$ | No change |

TABLE-continued

| Count | Subwindow | Address X | Y | Adding/subtracting operation control circuit 85A | 85B |
|---|---|---|---|---|---|
| 4 | $W_{S4}$ | $I_o - S_x$ | $J_o - S_y$ | Subtraction of $S_x$ | No change |
| 5 | $W_{S5}$ | $I_o - S_x$ | $J_o$ | No change | Addition of $S_y$ |
| 6 | $W_{S6}$ | $I_o - S_x$ | $J_o + S_y$ | No change | Addition of $S_y$ |
| 7 | $W_{S7}$ | $I_o$ | $J_o + S_y$ | Addition of $S_x$ | No change |
| 8 | $W_{S8}$ | $I_o - S_x$ | $J_o + S_y$ | Addition of $S_x$ | No change |

By performing control according to the adding/subtracting operation control circuits 85A and 85B in the order as shown in the table with respect to the X and Y directions, the addresses (I,J) of the respective surrounding subwindows are generated. The average density value $A_{ij}$ and the evenness discrimination flag $F_{ij}$ of the respective surrounding subwindows are respectively read as $C_k$ and $F_k$ (k=1, ..., 8).

Figure 22:
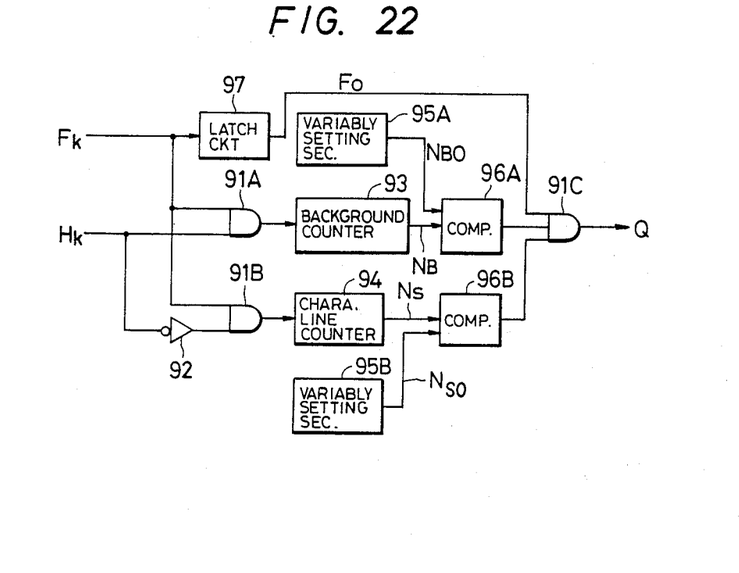
FIG. 22 is a diagram showing the character line discriminating section.

FIG. 22 shows the character line discriminating section 59 for performing binarizing on the basis of the background discrimination flag $H_k$ and the evenness discrimination flag $F_k$ relating to the surrounding subwindow. The section 59 is composed of AND gates 91A, 91B, and 91C, an inverter gate 92, a background counter 93, a character line counter 94, a background number variably setting part 95A (variably setting section), a character line number variably setting part 95B (variably setting section), comparators 96A and 96B, and a target subwindow discrimination flag latch circuit 97 (latch circuit).

When the subwindow is even ($F_k=1$), subwindows on which the decision of background ($H_k=1$) is made are counted by the counter 93 and, on the other hand, subwindows on which the decision of character line ($H_k=0$) is made are counted by the counter 94. The comparator 96A compares the background subwindow number $N_B$ with a set value $N_{B0}$ set by the variably setting part 95A, and the comparator 96B compares the character line (stroke) subwindow number $N_S$ with a set value $N_{S0}$ set by the variably setting part 95B. The logical product of the result of comparison and the output $F_o$ of the latch circuit 97 which expresses the target subwindow evenness discrimination flag is calculated by the AND gate 91C to generate output Q corresponding to the respective target subwindow. For example, the set values from the variably setting parts 95A and 95B, respectively, are selected as follows.

$$N_{B0}=2, N_{S0}=1$$

In the case where the subwindow is uneven ($F_k=0$), it is decided that the target pixel is not a character line pixel but a background pixel and the output Q is expressed as follows:

$$Q = \begin{cases} 1: & F_o = 1, N_B \geq N_{B0}, \text{ and } N_S \geq N_{S0} \\ 0: & \text{Other conditions} \end{cases}$$

Figure 22A:
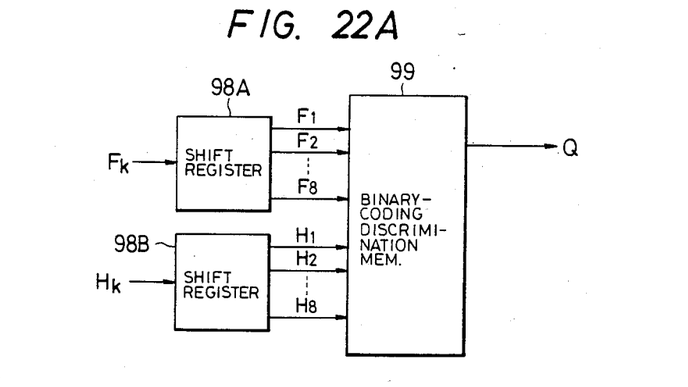
FIG. 22A is a diagram showing another example of the character line discriminating section.

The character line discriminating section 59 may also be constructed as shown in FIG. 22A. The section 59 of FIG. 22A is composed of shift resistors 98A and 98B, and a binarizing discrimination memory (ROM) 99. Flags $F_k$ and $H_k$ are introduced to the shift resistors 98A and 98B and developed into $F_1$ to $F_8$ and $H_1$ to $H_8$, respectively. By use of these developed flags as addresses, the contents of the memory 99 are read to obtain the output Q.

Although various embodiments according to the invention have been described, it is a matter of course that various kinds of set values can be adjusted to be optimum values corresponding to the nature of line graphics to be used. Although the invention has been applied to the case where an area of 3×3 pixels is used as each subwindow, it is to be understood that the number of pixels used as a subwindow may be suitably selected. For example, the invention is applicable to the case where the subwindow is composed of one pixel.

What is claimed:

1. A binarizing apparatus comprising:
   image pickup means for converting an image of a line graphic or of characters, said image having a background, into electric signals;
   A/D converter means for converting the electric signals into digital image signals;
   frame memory means for storing the digital image signals from said A/D converter means;
   square grating window generating means for receiving the stored digital image signals from said frame memory means, and for generating a square grating window, said square grating window having a target subwindow and a plurality of pairs of surrounding subwindows provided around said target subwindow, wherein each subwindow represents separated portions of the line graphic and wherein each subwindow pair has subwindows opposite each other;
   first arithmetical operating means connected to said window generating means for arithmetically calculating an average density value for each of said target subwindow and said surrounding subwindows;
   first extracting means connected to said first arithmetical operating means for extracting a background density value from the average density values of said surrounding subwindows;
   second arithmetical operating means connected to said first arithmetical operating means for arithmetically calculating a counter density difference value between each pair of said surrounding subwindows opposite each other, and for arithmetically calculating an average density value for said each pair, said calculations being performed according to said average density values for each window of said pair from said first arithmetical operating means;
   third arithmetical operating means for arithmetically calculating a background density difference value for each subwindow pair representing the difference between the average density value from said second arithmetical operating means and the background density value from said first extracting means;

second extracting means for extracting a background flatness value from the background density difference value for each subwindow pair from said third arithmetical operating means and the counter density difference value from said second arithmetical operating means;

fourth arithmetical operating means for arithmetically calculating a target density difference value for each subwindow pair represented by the difference value between the average density value for the target subwindow from said first arithmetical operating means and the average density value from said second arithmetical operating means;

first discriminating means for comparing the target density difference value for each subwindow pair from said fourth arithmetical operating means with a predetermined density difference lower limit value;

second discriminating means for comparing the background flatness value for each subwindow pair from said second extracting means with a predetermined flatness upper limit value; and character line detecting means for receiving outputs from said first and second discriminating means and for determining whether the target subwindow belongs to a character line and for binarizing said received outputs according to said determination.

2. A binarizing apparatus as claimed in claim 1, wherein said square grating window is composed of nine subwindows.

3. A binarizing apparatus as claimed in claim 1, wherein said surrounding subwindows are separated from said target subwindow by a distance of not less than a line width of the line graphic.

4. A binarizing apparatus as claimed in claim 1, wherein each of said subwindows has a square area of 3×3 pixels.

5. A binarizing apparatus comprising:

scanning means for scanning a line graphic including characters and a background, to produce pixels;

window generating means for successively generating groups of windows, each of said group of windows including a plurality of subwindows generated from separated portions of the line graphic, said plurality of subwindows including a target subwindow and surrounding subwindows arranged around said target subwindow, said target subwindow including a target pixel and surrounding pixels;

arithmetical operating means for arithmetically calculating an average density value for each of said subwindows;

first discriminating means for determining from the average density value for each of said subwindows whether each area of said windows is a uniform density area;

second discriminating means for determining from the average density of said target and surrounding subwindows whether each of said surrounding subwindows is a background component of said line graphic; and detecting means for receiving outputs from said first and second discriminating means and for determining whether said target pixel of said target subwindow belongs to the line graphic and for binarizing said received outputs according to said determination.

6. A binarizing apparatus as claimed in claim 5, wherein said plurality of windows is composed of nine subwindows.

7. A binarizing apparatus as claimed in claim 5, wherein said surrounding subwindows are separated from said target subwindow at a distance not less than a line width of the line graphic.

8. A binarizing apparatus as claimed in claim 5, wherein each of said subwindows has a square area of 3×3 pixels.

* * * * *